United States Patent
Harkins

(10) Patent No.: US 10,094,603 B2
(45) Date of Patent: *Oct. 9, 2018

(54) SYSTEM AND METHOD FOR RETROFITTING A REFRIGERATION SYSTEM FROM HCFC TO HFC REFRIGERANT

(71) Applicant: Hudson Technologies, INc., Pearl River, NY (US)

(72) Inventor: Charles Harkins, Hampstead, NH (US)

(73) Assignee: Hudson Technologies, Inc., Pearl River, NY (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/255,826

(22) Filed: Sep. 2, 2016

(65) Prior Publication Data

US 2017/0131009 A1 May 11, 2017

Related U.S. Application Data

(63) Continuation of application No. 14/877,609, filed on Oct. 7, 2015, now Pat. No. 9,435,575, which is a
(Continued)

(51) Int. Cl.
| | |
|---|---|
| *F25B 45/00* | (2006.01) |
| *C10M 171/00* | (2006.01) |
| *C10M 105/38* | (2006.01) |
| *F25B 31/00* | (2006.01) |
| *C09K 5/04* | (2006.01) |

(52) U.S. Cl.
CPC .............. *F25B 45/00* (2013.01); *C09K 5/045* (2013.01); *C10M 105/38* (2013.01); *C10M 171/008* (2013.01); *F25B 31/002* (2013.01); *C09K 2205/104* (2013.01); *C09K 2205/122* (2013.01); *C09K 2205/22* (2013.01); *C09K 2205/40* (2013.01); *C09K 2205/43* (2013.01); *C10M 2207/2835* (2013.01);
(Continued)

(58) Field of Classification Search
CPC .. F25B 45/00; F25B 31/002; F25B 2345/001; F25B 2345/007; C10M 105/38; C10M 171/008; C10M 2207/122; C09K 2205/122; C09K 2205/43; C09K 2205/40; C09K 2205/104; C10N 2220/302; C10N 2240/30; C10N 2207/2835
USPC ............................................. 62/77, 149, 292
See application file for complete search history.

(56) References Cited

U.S. PATENT DOCUMENTS

| | | | |
|---|---|---|---|
| 8,205,462 B1 * | 6/2012 | Zugibe | F25B 45/00 62/149 |
| 2005/0127321 A1 * | 6/2005 | Fagan | C09K 5/045 252/68 |

(Continued)

*Primary Examiner* — Mohammad M Ali
(74) *Attorney, Agent, or Firm* — Tully Rinckey PLLC; Steven M. Hoffberg

(57) ABSTRACT

A system and method for retrofitting a refrigeration system containing an HCFC refrigerant and a compatible lubricant, with an HFC refrigerant, comprising providing a transport container containing a mixture of about 5-15% by weight of a miscible lubricant and the HFC refrigerant, removing the HCFC refrigerant from the refrigeration system while maintaining at least a portion of a lubricant immiscible with the HFC refrigerant, and charging the refrigeration system with the mixture.

20 Claims, 2 Drawing Sheets

Related U.S. Application Data continuation of application No. 14/744,776, filed on Jun. 19, 2015.

(60) Provisional application No. 62/032,129, filed on Aug. 1, 2014, provisional application No. 62/017,530, filed on Jun. 26, 2014.

(52) U.S. Cl.
CPC .... *C10N 2220/302* (2013.01); *C10N 2240/30* (2013.01); *F25B 2345/001* (2013.01); *F25B 2345/007* (2013.01)

(56) References Cited

U.S. PATENT DOCUMENTS

| | | | | |
|---|---|---|---|---|
| 2008/0111100 A1* | 5/2008 | Thomas | ................. | C09K 5/045 252/68 |
| 2012/0145199 A1* | 6/2012 | Jernigan | ................. | F25B 45/00 134/22.19 |

* cited by examiner

SYSTEM AND METHOD FOR RETROFITTING A REFRIGERATION SYSTEM FROM HCFC TO HFC REFRIGERANT

CROSS REFERENCE TO RELATED APPLICATIONS

The present application is a Continuation of U.S. patent application Ser. No. 14/877,609, filed Oct. 7, 2015, now U.S. Pat. No. 9,435,575, issued Sep. 6, 2016, which is a Continuation of U.S. patent application Ser. No. 14/744,776, filed Jun. 19, 2015, now pending, and is a 35 U.S.C. § 371 national stage filing of PCT/US15/37689, filed Jun. 25, 2015, now pending, which each claim benefit of priority from U.S. Provisional Patent Application No. 62/032,129, filed Aug. 1, 2014 and from U.S. Provisional Patent Application No. 62/017,530, filed Jun. 26, 2014, the entirety of which are expressly incorporated herein by reference

FIELD OF THE INVENTION

The present invention relates to the field of refrigerants, refrigeration systems, and refrigeration system lubricants.

BACKGROUND OF THE INVENTION

R-407C is an HFC refrigerant replacement for R-22, a HCFC refrigerant, in positive displacement systems such as new or existing residential and commercial air-conditioners and heat pumps. R-407C offers similar performance to R-22 and can be used to retrofit existing R-22 air-conditioning and refrigeration systems.

R-407C is a mixture of hydrofluorocarbons used as a refrigerant. It is a zeotropic blend of difluoromethane (R-32), pentafluoroethane (R-125), and 1,1,1,2-tetrafluoroethane (R-134a). R-32, R-125 and R-134a are present in the proportions 23%/25%/52% by weight (a ±2% tolerance is allowed for each of the components). R-407A is a mixture of 20% R32, 40% R125, and 40% R-134a, and is therefore R-407A is similar in many respects to R407C. Difluoromethane serves to provide the heat capacity, pentafluoroethane decreases flammability, tetrafluoroethane reduces pressure. R-22 is chlorodifluoromethane.

Most compressors require a lubricant to protect internal moving parts. The compressor manufacturer usually recommends the type of lubricant and proper viscosity that should be used to ensure acceptable operation and equipment durability. Recommendations are based on several criteria, which can include: lubricity; lubricant/refrigerant solubility; lubricant/refrigerant miscibility; compatibility with materials of construction; and thermal stability and compatibility with other lubricants. It is important to follow the manufacturer's recommendations for lubricants to be used with their equipment.

Lubricant return to the compressors is very important as well. One factor that affects this is the liquid-phase lubricant/refrigerant miscibility, particularly at evaporator temperatures. Miscibility is the ability of two liquids to mix and form a single liquid phase. Ideally, the lubricant-refrigerant pair have sufficient miscibility or mutual solubility to allow the lubricant to flow with the liquid refrigerant and return to the compressor in a single phase. Even if the lubricant/refrigerant pair are not miscible (two liquid phases form) in the evaporator, they may still have some degree of solubility. Solubility of refrigerant in lubricant lowers lubricant viscosity, which helps it flow through the evaporator and return to the compressor. This is why many refrigeration systems can operate properly, even though the lubricant and refrigerant are immiscible (yet partially soluble) at evaporation temperatures. Other factors, such as refrigerant vapor velocity and system geometry, play key roles in lubricant return. Overall, it is important to note that lubricant/refrigerant miscibility is helpful, but not necessarily essential for proper system operation.

In general, R-22 and mineral oil are miscible over most of the expected ranges of operating conditions for normal air conditioning and high to medium temperature operation. Miscibility is generally believed to aid lubricant return to the compressor. The miscibility of refrigerant and lubricant is determined by several factors: the relative amounts of refrigerant and lubricant present, the temperature, the chemical makeup of the lubricant and of the refrigerant, and the viscosity of the lubricant.

Therefore, it may be desirable in a retrofit of an existing system of this type to use a miscible lubricant, such as polyol ester lubricant, with R-407C refrigerant. In general, R-407C is miscible with polyol ester (POE) lubricant and immiscible with alkylbenzene and mineral oil lubricant.

Residual mineral oil or alkylbenzene left in a refrigeration system after a retrofit to any HFC refrigerant is performed is known to decrease the lubricant/refrigerant miscibility. This is one of the reasons why three oil changes are generally recommended when a system is being converted or retrofit to use HFC refrigerants and POE lubricants. Thus, a traditional recommendation is to replace all mineral oil or alkylbenzene lubricant with POE during a retrofit.

Emerson Climate Technologies (Copeland®) provided in 1995 & 2005 the following recommendations when conducting a changeover: "Copeland's only approved lubricants for use with R-407C are Polyol ester lubricants"; "Mineral oil lubricant, such as 3GS, cannot be used as the compressor lubricant. Copeland recommends the following lubricant choices: Polyol Ester (POE)"; "The mineral oil must be removed from the compressor crankcase. Hermetic compressors will have to be removed from the piping and the lubricant drained out through the suction stub. It is advisable to do an acid test on the lubricant removed"; "Those systems that have oil separators, oil reservoirs, oil floats and suction line accumulators must have the oil drained from them. If the liquid control device is going to be replaced, it is advisable that the suction line, liquid line, and evaporator coil be blown clean using properly regulated dry nitrogen"; "POEs are very hygroscopic. They will very quickly absorb moisture from the air once the container is opened. Once the lubricant is added to the compressor, the compressor should be quickly installed. Like an open container, an open compressor with POE will absorb moisture. Add the correct amount of lubricant to the compressor. On systems using enhanced surfaces in the heat exchanger, excessive mineral oil can adversely affect the heat transfer due to logging. Therefore, it is desirable to have no more than one percent mineral oil in systems employing these types surfaces." lvhvac.com/cope_bulletins/95-14.pdf.

Dupont (2004) advises that no more than 5% mineral oil remain in the refrigeration system after a changeover from R-22 to R-407C. (www2.dupont.com/Refrigerants/en_US/assets/downloads/h70004_Suva407C_retrofit_guide.pdf)

Similarly, Tecumseh advised in 2009 (www.air-innovations.nl/web/pdf/GUIDELINES-FOR-UTILIZATION-OF-R407C.pdf):

Synthetic Lubricants: Polyol Esters (POEs) And Polyvinyl Ethers (PVEs)

A) Miscibility

1. Miscibility is the ability of the lubricant and the refrigerant to mix. This miscibility is a very important factor in providing proper heat transfer and in returning lubricant to the compressor in a refrigeration system over its range of operating temperatures.

2. R407C and Mineral oils (MO) are not miscible
3. Polyol Ester (POE) as well as Polyvinyl Ether (PVE) oils and R407C are miscible.
4. R407C and Synthetic Alkylate (SA) oils are partially miscible . . . .
C) Compatibility . . . .
2. While polyol ester and polyvinyl ether oils are compatible with mineral oils, they should not be indiscriminately mixed with mineral oils in R407C refrigerant systems. This practice could result in the inability of the oil to return to the compressor and/or reduce heat transfer performance in the evaporator. However, small amounts up to 5% of mineral oil are acceptable in field retrofit situations (1% or less is preferred).

Ennio Campagna et al., "The Use of R-407C: Applications and Guidelines", makina.beun.edu.tr/eskisite/akademik_kadro/meyriboyun/mak723/The_Use_of_R-407C.pdf, states:
1) General Considerations for HFC Refrigerants
Systems which use R407C normally have compressors charged with a miscible lubricant such as POE (polyolester). There are many manufacturers and grades of these lubricants. R-407C is generally not used with mineral or alkyl-benzene (i.e. hydrocarbon based) oils as the miscibility is not adequate to ensure satisfactory oil return to the compressor. It is very important that, when servicing a system and oil is needed, the correct oil be used. Seek guidance from the system or compressor manufacturer on which specific oil to use in a maintenance situation.
b) System contamination with mineral oils, or with R22, can have a serious effect on performance and system reliability. Systems which use enhanced tube heat exchangers (evaporators and condensers) are particularly vulnerable to performance degradation arising from the presence of HC based oils. It is strongly recommended that dedicated service gauge sets are used for R407C to prevent inadvertent contamination.

Similarly, Herronhill provides general guidelines to assist in the replacement of R22 condensing units with equivalent R407C units (2004, www.heronhill.co.uk/technical-information/40/converting-r22-systems-to-r407c), stating "Condensing units built and supplied by IMI Air Conditioning Ltd. (now Marstair Ltd) before 1999, for use with R22 will contain mineral oil. R407C units will contain polyolester oil (POE). Check the compressor label to confirm the type of oil in the system. For safe system operation it is essential to remove the mineral oil from the existing system, as R407C is not compatible with mineral oil. On completion of the change over the concentration of mineral oil remaining in the system should not exceed 5% of the total oil charge.

Sundaresan, S. G.; Pate, M. B.; Doerr, T. M.; and Ray, D. T., "A Comparison of the Effects of POE and Mineral Oil Lubricants on the In-Tube Evaporation of R-22, R-407C and R-410A" (1996). International Refrigeration and Air Conditioning Conference. Paper 322. docs.lib.purdue.edu/iracc/322, describe tests on the heat transfer efficiency of R-22, R-407C and R-410A on smooth and fined tubes, when neat, mixed with mineral oil, and when mixed with POE oil. POE-mineral oil mixtures were not tested. The heat transfer efficiency was higher for R-407C mixed with POE than with mineral oil.

Some more recent consideration of the choice or lubricant considers mixtures of lubricants, including mineral oil (MO) and polyol esters (POE). For example, The News, (Peter Powell, Dec. 3, 2012, www.achrnews.com/articles/print/121529-retrofit-round-up-plenty-of-options) states:

Retrofit Round-Up: Plenty of Options
Because no one HFC refrigerant can be retrofitted efficiently into the entire range of R-22 equipment, a wide and sometimes changing variety of HFCs have entered the market. The NEWS contacted a number of refrigerant manufacturers asking them to discuss some of their most popular HFCs for R-22 retrofits, the range of applications, and servicing tips.
While this can provide a guideline, The NEWS urges readers to contact refrigerant manufacturers directly to discuss the specific R-22 system being considered for retrofit and what HFC refrigerants might best work in such applications. This listing is in alphanumerical order according to ASHRAE designations.

R-407A
Gus Rolotti, technical marketing director of Arkema's North American fluorochemicals business, described R-407A as a refrigerant for low- and medium-temp refrigeration. "Both R-407A and R-407C are well proven in the industry and provide good performance coupled with a lower GWP. They require the use of a POE oil." Because of that, there needs to be a change-out of the mineral oil in an existing R-22 system.
Noted Rolotti, "First, fix any leaks and identify components that may need to be replaced or fixed. Recover the R-22 completely, repair/replace any components as identified earlier and pull the system into a deep vacuum. Remove the required amount of mineral oil either by flushing with an external agent or using the R-22 from the system. Once most of the mineral oil is removed, replace it with POE oil and pull the system into a deep vacuum again. Refill with the appropriate amount of the retrofit refrigerant and run the system to set up controls and operating conditions. It is recommended that the filter drier is always replaced when the system is opened to ensure that there is fresh desiccant available to dry the system."

R-407C
Arkema's Rolotti considers R-407C a choice for air conditioning. Retrofit procedures are similar to those with R-407A refrigerant.
In his comments regarding R-407C, Ron Vogl, technical marketing manager for Honeywell Refrigerants, described it as a choice for residential and light commercial a/c applications. The retrofit process for R-407C, he said, involves recovering R-22. Then, regarding oil, Vogl said, "POE is recommended. If existing MO is used, the addition of some POE to the system is required for proper oil return." The use of the refrigerant requires a minimum of 20 percent POE for close-coupled a/c systems with no liquid receivers. No TXV change required, but minor adjustments may be needed. Replace any O-rings, seals, and other elastomers used in the system. In most air conditioning and heat pump systems this only applies to the Schrader valve seal and cap seal material. The next step is to evacuate and recharge. (Pounds of 407C=pounds of original refrigerant×70.6 divided by 73.9.) Then adjust system safety and operating controls; label system indicating refrigerant and charged lubricant.

National Refrigerants, states (date unknown, www.nationalref.com/pdf/R22_Alternatives.pdf):
Will the blends work with mineral oil?
HFC Refrigerants with Mineral Oil
They don't mix so the mineral oil will form a separate layer in the receiver or other high-side liquid hold up.

Mineral Oil will remain thick on the low side and not be returned back to the compressor.
Will the blends work with mineral oil?
Hydrocarbons (HC) in Blends
HC soaks into mineral oil and thins it so it will circulate easily around the system.
The thinned mineral oil will move easily on the low side.
The mineral oil/HC mixture will still not mix with liquid HFC on the high side of the system. A layer of oil will still form in the receiver or other liquid hold-up.
Partial POE Retrofit
Some amount of mineral oil is replaced with POE (does not require 3 flushes or less than 5% mineral oil).
The POE mixes well with the mineral oil, and the resulting mixture dissolves somewhat into liquid HFC.
The oil mixture will be carried by the liquid HFC out of the receiver.
National Refrigerants testing has shown that as little as 10% POE in mineral oil will circulate as much as an older compressor will pump out into a system.
These tests have also shown that there is very little difference in oil solubility with all of the blends on the market, regardless of the hydrocarbon content in the blend. Partial POE works with all of the blends, but hydrocarbons do not appear to help with liquid solubility of mineral oil with HFCs.

Therefore, there has been some evolution as to whether mineral oil can remain in the refrigeration system after a retrofit, with the permissible proportion of mineral oil increasing. In particular, National Refrigerants proposes a partial POE retrofit, with greater than 5% mineral oil remaining. However, the existing recommendations appear to require empirical testing for cases other than less than 5% mineral oil remaining.

See, U.S. Pat. Nos. 2,834,748; 2,846,458; 2,889,379; 2,917,480; 2,931,840; 2,970,988; 3,085,918; 3,384,828; 3,723,318; 3,884,828; 4,138,855; 4,198,313; 4,272,960; 4,465,786; 4,482,465; 4,788,352; 4,798,818; 4,810,403; 4,941,986; 4,944,890; 5,026,497; 5,053,155; 5,080,823; 5,108,637; 5,182,040; 5,227,245; 5,304,320; 5,318,716; 5,360,566; 5,370,812; 5,387,357; 5,417,871; 5,425,890; 5,458,798; 5,616,275; 5,622,644; 5,624,596; 5,626,790; 5,648,017; 5,672,293; 5,685,163; 5,714,083; 5,785,883; 5,788,886; 5,811,603; 5,968,406; 6,025,532; 6,106,740; 6,111,150; 6,117,356; 6,235,951; 6,258,292; 6,316,681; 6,374,629; 6,426,019; 6,516,837; 6,526,764; 6,589,355; 6,604,368; 6,606,868; 6,629,419; 6,673,976; 6,783,691; 6,858,571; 6,991,743; 7,238,299; 7,279,451; 7,341,984; 7,442,321; 7,465,698; 7,524,805; 7,629,306; 7,767,638; 7,825,081; 7,829,748; 7,833,433; 7,846,355; 7,862,742; 7,972,528; 8,008,244; 8,053,404; 8,101,672; 8,148,317; 8,444,874; 8,465,664; 8,551,354; 8,557,136; U.S. Published Patent Application Nos. 20020046568; 20030042463; 20040089839; 20040119047; 20040127383; 20040256594; 20050233923; 20050233931; 20050233932; 20050245421; 20050247905; 20060019857; 20060025322; 20060043331; 20060058560; 20060243944; 20060243945; 20070007488; 20070010592; 20070069175; 20070108403; 20070210275; 20070210276; 20070290163; 20070290177; 20080069177; 20080075673; 20080099190; 20080121837; 20080171652; 20080230738; 20080308763; 20080314073; 20090041677; 20090053695; 20090120619; 20090158771; 20090224199; 20090242828; 20090253820; 20090278076; 20090285764; 20090302285; 20090305876; 20100025619; 20100044619; 20100048961; 20100075046; 20100122545; 20100127209; 20100200798; 20110162410; 20110226983; 20110289748; 20120138846; 20120187331; 20120312048; 20130075063; 20130119299; 20130126776; 20130126777; 20130126778; CN101864276; CN95117074; DE4116274; EP0398147; EP0430169; EP0509673; EP0539952; EP0565265; EP0582451; EP0608164; EP0659862; EP0720639; EP0779352; EP0974571; EP1167894; EP1193305; EP1716216; EP1832640; EP1985680; EP2036943; EP2149592; EP2246649; EP2249104; GB2007000746; GB2435747; GB2440258; JP4110388; RU2073058; WO1998050331; WO2004037752; WO2004037913; WO2005042663; WO2005083028; WO2005103190; WO2005103191; WO2005103192; WO2005105947; WO2005108522; WO2005108523; WO2006094303; WO2007002625; WO2007035697; WO2007053697; WO2007099350; WO2007109748; WO2008027555; WO2008065011; WO2008076272; WO2008121776; WO2008121783; WO2008121785; WO2009047535; WO2009114397; WO2009134957; WO2009151669; WO2010000993; WO2010000994; WO2010002020; WO2010002023; WO2010056695; WO2010059677; WO2010065005; WO2010075046; WO2010088320; WO2010119265; WO2011019350; each of which is expressly incorporated herein by reference in its entirety.

SUMMARY OF THE INVENTION

The present invention provides a premixed HFC refrigerant and compatible POE lubricant, e.g., in a transport container. The amount of lubricant is selected to an amount between about 5% to 20% by weight of the refrigerant. Preferably, the amount is 8% by weight.

The amount of POE should be at least 10% of the total lubricant amount, with about 20% POE by weight of refrigerant representing the amount of POE in the absence of mineral oil.

The mixture is preferably provided in a transport container, typically DOT approved, such as a DOT-39 container.

The refrigerant-lubricant mixture is charged into the refrigeration system after recovery of the R-22 from the system, without special efforts to remove the mineral oil lubricant. Assuming that the residual mineral oil is 8-24% of the charge, and the mixed refrigerant includes 8% POE, the resulting mixture is about 25-50% of the total lubricant, and the resulting mixed lubricant is 16-32% of refrigerant charge. Therefore, the present technology provides a compromise amount of lubricant that is sufficient to provide a charge to a range of refrigeration systems to be retrofitted, without having to remove mineral oil already in the system, measure the amount of oil removed or infer the total amount, measure an amount of POE to be added to the system based on the actual amount of R-407C added to the system, or measuring mineral oil/POE ratios.

Therefore, the present technologies vastly simplify the process for retrofitting, while achieving good results. Indeed, preliminary tests show that the efficiency of an R-22 air conditioning system is improved after the retrofitting, a surprising result given that the system itself is optimized for R-22 and mineral oil.

The container may be, for example, a 10, 15, 20, 30, 40, 50, 96, 123 pound or larger container. The amount of lubricant may be, for example, 0.8, 1.2, 1.6, 2.4, 3.2, 4, 8, or 10 pounds (8% lubricant). Bulk quantities may also be provided.

The amount of POE may be varied, for example, and may be about 5%, 6%, 7%, 7.5%, 8%, 9%, 10%, 12%, 12.5%, 15%, or the like. The precision of measurement may be, for example. ±0.1%, ±0.2%, ±0.25%, ±0.3%, ±0.5%, ±0.75%, ±1%, or ±2%. Preferably, the precision is within ±0.5%.

The container may be a DOT 3, 3A, 3AA, 3AL, 3B, 3BN, 3E, 4B, 4BA, 4B240ET, 4BW, 4E, 39, steel drum, for example: DOT-3AL1800; DOT 4D; DOT-3; DOT-39; DOT-3A; DOT-3A1000; DOT-3A1200; DOT-3A150; DOT-3A1800; DOT-3A2000; DOT-3A225; DOT-3A240; DOT-3A2400; DOT-3A300; DOT-3A400; DOT-3A480; DOT-3A480X; DOT-3AA; DOT-3AA1000; DOT-3AA1200; DOT-3AA150; DOT-3AA1800; DOT-3AA2000; DOT-3AA225; DOT-3AA240; DOT-3AA2400; DOT-3AA300; DOT-3AA400; DOT-3AA480; DOT-3AAX1800; DOT-3AAX2000; DOT-3AAX2200; DOT-3AAX2400; DOT-3AL; DOT-3AL1000; DOT-3AL150; DOT-3AL1800; DOT-3AL2000; DOT-3AL225; DOT-3AL240; DOT-3AL2400; DOT-3AL400; DOT-3AL480; DOT-3AX1800; DOT-3AX2000; DOT-3AX2200; DOT-3AX2400; DOT-3B; DOT-3B150; DOT-3B1800; DOT-3B225; DOT-3B240; DOT-3B300; DOT-3B400; DOT-3BN400; DOT-3BN480; DOT-3E1800; DOT-3HT; DOT-3HT2000; DOT-3T1800; DOT-3T2000; DOT-3T2200; DOT-3T2400; DOT-4A; DOT-4AA480; DOT-4B; DOT-4B150; DOT-4B150; DOT-4B225; DOT-4B240; DOT-4B240ET; DOT-4B300; DOT-4B400; DOT-4B480; DOT-4BA; DOT-4BA225; DOT-4BA240; DOT-4BA300; DOT-4BA400; DOT-4BW; DOT-4BW225; DOT-4BW240; DOT-4BW300; DOT-4BW400; DOT-4BW480; DOT-4DA; DOT-4DS; DOT-4E225; DOT-4E240; DOT-4L; DOT-AAX2400; and ICC-3E1800.

The preferred embodiment encompasses R-407C. However, the method is more generally directed to a retrofitting of systems employing a range of refrigerants that generally require mineral oil, alkane or alkylbenzene lubricants (CFC, PCC, HCC, HCFC, CFO, HCFO), with refrigerants that generally require polymeric or oxygenated lubricants, e.g., POE, PVE (HFC, PFO) (CFC=Chlorofluorocarbon, CFO=Chlorofluoroolefin, HCFC=Hydrochlorofluorocarbon, HCFO=Hydrochlorofluoroolefin, HFC=Hydrofluorocarbon, HFO=Hydrofluoroolefin, PCC=Perchlorocarbon). See Table 1, en.wikipedia.org/wiki/List_of_refrigerants.

It is therefore an object to provide a transportable container for charging a refrigerant system, having a charging port, containing a polyol ester (POE) lubricant and a compatible HFC refrigerant in a predetermined proportion. The proportion may be at least 2%, 3%, or 5% by weight and less than 25%, 20%, or 15% by weight, and preferably 8% by weight.

It is another object to provide a composition for retrofitting an R-22 refrigeration system, comprising POE and R-407C. The POE may be present at between 2-25%, 3-20%, 5-15%, or preferably 8% by weight, with the balance substantially R-407C.

It is a further object to provide a method for retrofitting a refrigeration system from R-22 refrigerant to R-407C refrigerant, comprising evacuating the R-22 refrigerant from the refrigeration system while maintaining at least 25% of the lubricant, wherein the lubricant is not POE, and adding a premixture of POE mixed in R-407C to charge the refrigeration system. The POE may be present at between 2-25%, 3-20%, 5-15%, or preferably 8% by weight, with the balance substantially R-407C.

It is a still further object to provide a retrofit kit for an R-22 refrigeration system, comprising a DOT-approved transport container for R-407C containing a mixture of R-407C and POE, and at least one replacement seal compatible with R-407C. The POE may be present at between 2-25%, 3-20%, 5-15%, or preferably 8% by weight, with the balance substantially R-407C.

It is a still further object to provide a method for retrofitting a hermetically sealed refrigeration system from an HCFC refrigerant compatible with a mineral oil or alkyl benzene lubricant to a HFC refrigerant compatible with polyol ester lubricant, comprising: providing a transport container containing the HFC refrigerant mixed with polyol ester lubricant; withdrawing the HCFC from within the refrigeration system through a charge-discharge port, leaving at least a portion of the mineral oil or alkyl benzene lubricant; and charging the refrigeration system from the transport container with the HFC mixed with the polyol ester lubricant. The polyol ester lubricant may be present at between 2-25%, 3-20%, 5-15%, or preferably 8% by weight, with the balance substantially HFC.

Another object is to provide a method for retrofitting a system from an HCFC refrigerant compatible with a mineral oil or alkyl benzene lubricant to an HFC refrigerant compatible with a polyol ester lubricant, comprising: evacuating the HCFC from the system, leaving at least a portion of the mineral oil or alkyl benzene lubricant; and charging the refrigeration system with an HFC refrigerant mixed with a polyol ester lubricant in a predetermined ratio of 5-15% by weight.

A kit is provided for retrofitting an HCFC refrigeration system having residual mineral oil lubricant, comprising: a transport container, containing an HFC refrigerant mixed polyol ester lubricant. A kit is also provided for retrofitting an R-22 refrigeration system having residual mineral oil lubricant, comprising: a U.S. Department of Transportation certified transport container; and R-407C mixed with polyol ester lubricant. The polyol ester lubricant may be present at between 2-25%, 3-20%, 5-15%, or preferably 8% by weight. The mineral oil or alkyl benzene lubricant may be a mineral oil lubricant.

The HCFC to be replaced may comprise R-22, R-401A, R-409A, R-401B, R-409B, R-402A, R-402B, R-403B, R-408A, R-502, and/or mixtures of HCFCs, for example as provided in Table 1.

The HFC may comprise R-134a, R-404A, R-407A, R-407C, R-407F, R-410A, R-417A, R-417B, R-422A, R-422B, R-422C, R-422D, R-424A, R-427A, R-428A, R-434A, R-438A, R-442A, and RS07A, or for example, other blends of difluoromethane (R-32), pentafluoroethane (R-125), and 1,1,1,2-tetrafluoroethane (R-134a). Other HFCs or HFC blends, or HFC/HC blends, for example as provided in Table 1, may also be employed. The HFC may be a zeotropic blend.

The refrigeration system after recharging may have a concentration of about 15-32% mixed lubricant, or a concentration of about 20-25% mixed lubricant, or a concentration of about 15-25% mixed lubricant, by weight.

The transport container may be U.S. Department of Transportation compliant, e.g., DOT-39.

The metrics recited herein are intended to be interpreted according to common understanding and usage among those skilled in the art of refrigerant manufacture, distribution, and refrigeration system maintenance.

DETAILED DESCRIPTION OF THE PREFERRED EMBODIMENT

Figure 1:
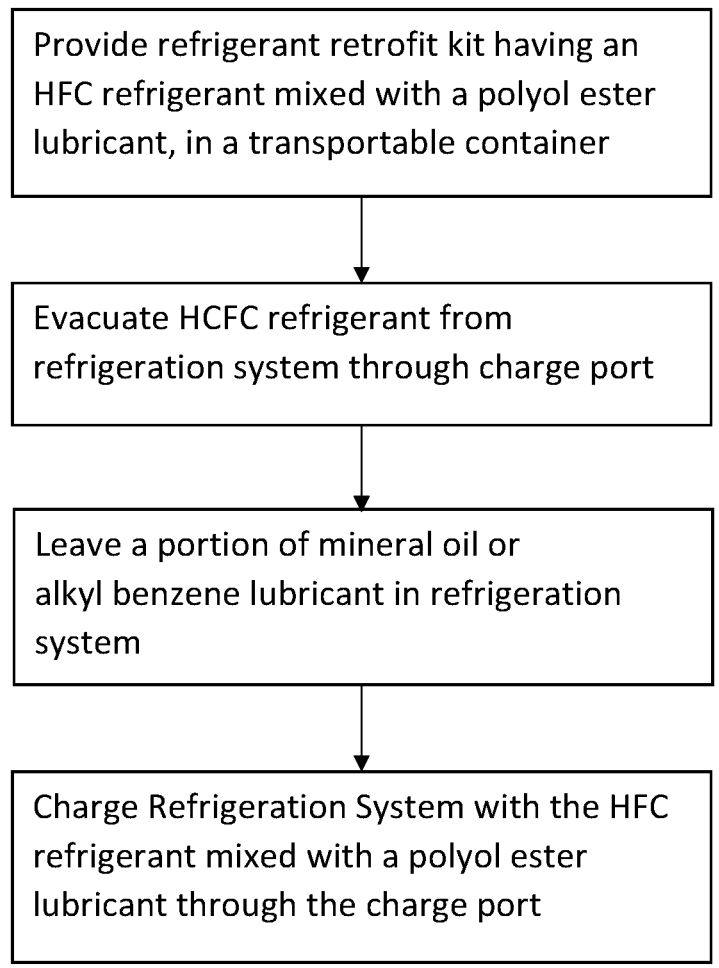
FIG. 1 shows a flowchart of a method according to the present invention.

FIG. 1 shows a flowchart of a method according to the present invention. A refrigerant retrofit kit is provided, having within a transportable container, a mixture of a refrigerant and a compatible POE lubricant. The refrigerant is typically an HFC refrigerant. The HCFC refrigerant is evacuated from a refrigeration system to be retrofit, and a portion of the existing lubricant, which is a mineral oil or alkyl benzene lubricant, is removed through the charge port of the refrigeration system, without disassembly of the system. A portion of the mineral oil or alkyl benzene lubricant remains in the refrigeration system. The refrigeration system is then charged with the mixture of the refrigerant and the compatible POE lubricant through the charge port.

Figure 2:
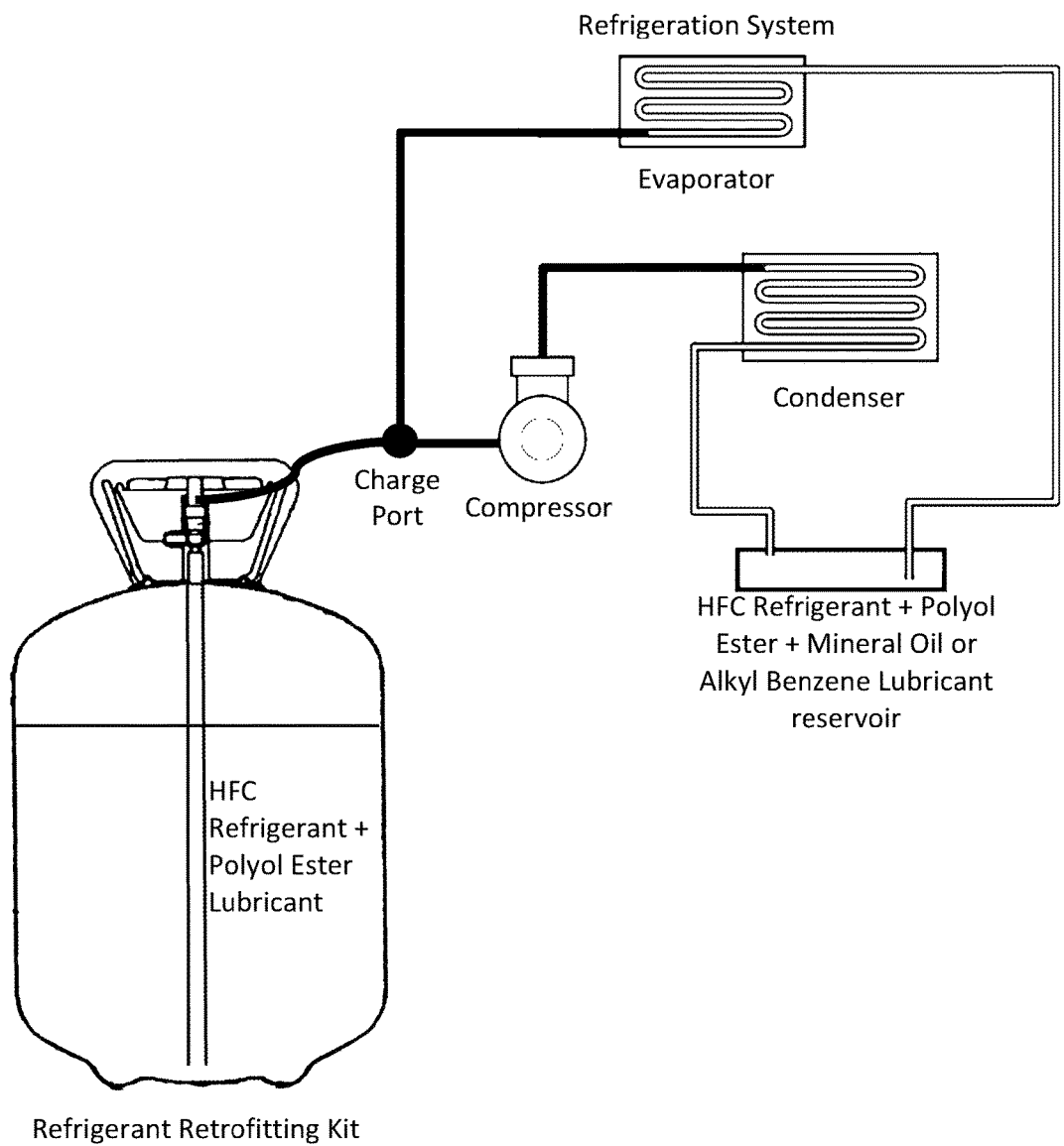
FIG. 2 shows a schematic diagram of the refrigeration system, after an HCFC refrigerant is removed, and while an HFC refrigerant and POE lubricant is being charged.

As shown in the schematic representation in FIG. 2, the refrigeration system includes a compressor, condenser and evaporator, as well as a charge port. A reservoir pools liquid refrigerant, as well as lubricants found within the system. After the HCFC refrigerant is removed from the system, a portion of the mineral oil or alkyl benzene lubricant remains in the system. During charging, the new refrigerant, typically an HFC, with a compatible POE lubricant, is drawn into the refrigeration system through the charge port, resulting in a mixed lubricant containing mineral oil or alkyl benzene lubricant and POE.

Example 1

A test was conducted of a residential air conditioning unit to determine the results of retrofitting an R-22 system with R-407C. In the test, the R-22 system, which was design and manufactured optimally for R-22, and used a mineral oil lubricant, was retrofitted with R-407C.

Instead of removing all of the mineral oil in the system, and replacing it with a defined amount of POE oil, which is required for R-407C, the R-22 was removed, and the residual mineral oil allowed to remain.

The evacuated system was recharged with a premixed quantity of R-407C with 8% by weight POE oil. Since R-407C is charged in the liquid phase, all of the oil, and most of the R-407C was transferred to the system from a transport container, e.g., DOT-39. The final POE concentration is estimated at 10-15% of the total oil in the system.

Prior to retrofitting, system was run for 13 hours over two days with the R-22 to collect the baseline data. The R-22 was then evacuated, and charged with R-407C to about 85% of the R-22 charge. The retrofitted refrigeration system with R-407C was then run for 91 hours.

The operating temperatures for R-22 (>86F and <86F) and R-407C (<86F) were not the same, so performance measurements are not directly comparable, but the results support a conclusion that the R-407C does not degrade system efficiency performance.

Therefore, despite the various unknowns, including the amount of mineral oil remaining in the system, migration characteristics of the mixed lubricants around the system, the impact of the various lubricant phases on compressor lubrication, the operation of the system with R-407C was improved over the R-22 implementation.

Comparative Example 1

See: www.honeywell-refrigerants.com/india/?document=guide-to-retrofitting-ac-systems-from-r-22-to-r-422d-or-r-407c&download=1; www.honeywell.com/sites/servlet/com.merx.npoint.servlets.DocumentServlet?docid=DB0284B 88-942E-BOA5-4028-CAFB85BB40AB, which are expressly incorporated herein by reference.

Comparative Example 2

See: www2.dupont.com/Refrigerants/en_US/assets/downloads/h70004_Suva407C_retrofit_guide.pdf, which is expressly incorporated herein by reference.

Comparative Example 3

See: opi.emersonclimate.com/CM/GRAPHICS/Types/AEB/95-14.pdf, which is expressly incorporated herein by reference.

Comparative Example 4

See: www.refrigerants.com/pdf/Nat-R407Broch.pdf, which is expressly incorporated herein by reference.

Comparative Example 5

See: neilorme.com/Tecumseh %20Guidelines %20R407c.shtml, which is expressly incorporated herein by reference.

Comparative Example 6

See: www.bristolcompressors.com/files/1313/5464/2815/application_bulletin_124.pdf, which is expressly incorporated herein by reference.

Comparative Example 7

See: americas.forane.com/export/sites/forane-americas/.content/medias/downloads/literature/forane-technical-digest.pdf, which is expressly incorporated herein by reference.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

TABLE 1

| Type | ASHRAE Number | IUPAC Name | Molecular Formula | CAS Number |
|---|---|---|---|---|
| CFC | R-211 | 1,1,1,2,2,3,3-Heptachloro-3-fluoropropane | $C_3FCl_7$ | 422-78-6 |
| CFC | R-112a | 1,1,1,2-Tetrachloro-2,2-difluoroethane | $C_2F_2Cl_4$ | 76-11-9 |

TABLE 1-continued

| Type | ASHRAE Number | IUPAC Name | Molecular Formula | CAS Number |
|---|---|---|---|---|
| CFC | R-213 | 1,1,1,3,3-Pentachloro-2,2,3-trifluoropropane | $C_3F_3Cl_5$ | 6/5/2354 |
| CFC | R-215 | 1,1,1-Trichloro-2,2,3,3,3-pentafluoropropane | $C_3F_5Cl_3$ | 4259-43-2 |
| CFC | R-113a | 1,1,1-Trichlorotrifluoroethane | $C_2F_3Cl_3$ | 354-58-5 |
| CFC | R-112 | 1,1,2,2-Tetrachloro-1,2-difluoroethane | $C_2F_2Cl_4$ | 76-12-0 |
| CFC | R-113 | 1,1,2-Trichlorotrifluoroethane | $C_2F_3Cl_3$ | 76-13-1 |
| CFC | R-114a | 1,1-Dichlorotetrafluoroethane | $C_2F_4Cl_2$ | 374-07-2 |
| CFC | R-214 | 1,2,2,2-Tetrachloro-1,1,3,3-tetrafluoropropane | $C_3F_4Cl_4$ | 2268-46-4 |
| CFC | R-216 | 1,2-Dichloro-1,1,2,3,3,3-hexafluoropropane | $C_3F_6Cl_2$ | 661-97-2 |
| CFC | R-114 | 1,2-Dichlorotetrafluoroethane | $C_2F_4Cl_2$ | 76-14-2 |
| CFC | R-216ca | 1,3-Dichloro-1,1,2,2,3,3-hexafluoropropane | $C_3F_6Cl_2$ | 662-01-1 |
| CFC | R-217 | 1-Chloro-1,1,2,2,3,3,3-heptafluoropropane | $C_3F_7Cl$ | 422-86-6 |
| CFC | R-217ba | 2-Chloro-1,1,1,2,3,3,3-heptafluoropropane | $C_3F_7Cl$ | 76-18-6 |
| CFC | R-C317 | Chloroheptafluorocyclobutane | $C_4ClF_7$ | 377-41-3 |
| CFC | R-115 | Chloropentafluoroethane | $C_2F_5Cl$ | 76-15-3 |
| CFC | R-13 | Chlorotrifluoromethane | $CClF_3$ | 75-72-9 |
| CFC | R-12 | Dichlorodifluoromethane | $CCl_2F_2$ | 75-71-8 |
| CFC | R-C316 | Dichlorohexafluorocyclobutane | $C_4Cl_2F_6$ | 356-18-3 |
| CFC | R-212 | Hexachlorodifluoropropane | $C_3F_2Cl_6$ | 76546-99-3 |
| CFC | R-111 | Pentachlorofluoroethane | $C_2FCl_5$ | 354-56-3 |
| CFC | R-400 | R-/114(50/50 wt %) OR (60/40)(must be specified) | 50% $CCl_2F_2$•50% $C_2F_4Cl_2$ OR 60% $CCl_2F_2$•40% $C_2F_4Cl_2$ | |
| CFC | R-11 | Trichlorofluoromethane | $CCl_3F$ | 75-69-4 |
| CFO | R-1112a | 1,1-Dichloro-2,2-difluoroethylene | $C_2Cl_2F_2$ | 79-35-6 |
| CFO | R-1113 | Chlorotrifluoroethylene | $C_2ClF_3$ | 79-38-9 |
| HCC | R-130a | 1,1,2,2-Tetrachloroethane | $C_2H_2Cl_4$ | 630-20-6 |
| HCC | R-140a | 1,1,1-Trichloroethane (Methyl chloroform) | $C_2H_3Cl_3$ or $CH_3CCl_3$ | 71-55-6 |
| HCC | R-130 | 1,1,2,2-Tetrachloroethane | $C_2H_2Cl_4$ | 79-34-5 |
| HCC | R-140 | 1,1,2-Trichloroethane | $C_2H_3Cl_3$ | 79-00-5 |
| HCC | R-150a | 1,1-Dichloroethane | $C_2H_4Cl_2$ | 75-34-3 |
| HCC | R-150 | 1,2-Dichloroethane | $C_2H_4Cl_2$ | 107-06-2 |
| HCC | R-160 | Chloroethane (ethyl chloride) | $C_2H_5Cl$ | 75-00-3 |
| HCC | R-20 | Chloroform (Trichloromethane) | $CHCl_3$ | 67-66-3 |
| HCC | R-40 | Chloromethane | $CH_3Cl$ | 74-87-3 |
| HCC | R-30 | Dichloromethane (Methylene chloride) | $CH_2Cl_2$ | 75-09-2 |
| HCC | R-120 | Pentachloroethane | $C_2HCl_5$ | 76-01-7 |
| HCFC | R-221 | 1,1,1,2,2,3-Hexachloro-3-fluoropropane | $C_3HFCl_6$ | 422-26-4 |
| HCFC | R-121a | 1,1,1,2-Tetrachloro-2-fluoroethane | $C_2HFCl_4$ | 354-11-0 |
| HCFC | R-222c | 1,1,1,3,3-Pentachloro-2,2-difluoropropane | $C_3HF_2Cl_5$ | 422-49-1 |
| HCFC | R-223cb | 1,1,1,3-Tetrachloro-2,2,3-trifluoropropane | $C_3HF_3Cl_4$ | 422-50-4 |
| HCFC | R-232cb | 1,1,1,3-Tetrachloro-2,2-difluoropropane | $C_3H_2F_2Cl_4$ | 677-54-3 |
| HCFC | R-224cc | 1,1,1-Trichloro-2,2,3,3-tetrafluoropropane | $C_3HF_4Cl_3$ | 422-51-5 |
| HCFC | R-233cc | 1,1,1-Trichloro-2,2,3-trifluoropropane | $C_3H_2F_3Cl_3$ | 131211-71-7 |
| HCFC | R-122b | 1,1,1-Trichloro-2,2-difluoroethane | $C_2HF_2Cl_3$ | 354-12-1 |
| HCFC | R-131b | 1,1,1-Trichloro-2-fluoroethane | $C_2H_2FCl_3$ | 2366-36-1 |
| HCFC | R-121 | 1,1,2,2-Tetrachloro-1-fluoroethane | $C_2HFCl_4$ | 354-14-3 |
| HCFC | R-122a | 1,1,2-Trichloro-1,2-difluoroethane | $C_2HF_2Cl_3$ | 354-15-4 |
| HCFC | R-131a | 1,1,2-Trichloro-1-fluoroethane | $C_2H_2FCl_3$ | 811-95-0 |
| HCFC | R-122 | 1,2,2-Trichloro-2,2-difluoroethane | $C_2HF_2Cl_3$ | 354-21-2 |
| HCFC | R-131 | 1,1,2-Trichloro-2-fluoroethane | $C_2H_2FCl_3$ | 359-28-4 |
| HCFC | R-223ca | 1,1,3,3-Tetrachloro-1,2,2-trifluoropropane | $C_3HF_3Cl_4$ | 422-52-6 |
| HCFC | R-232ca | 1,1,3,3-Tetrachloro-2,2-difluoropropane | $C_3H_2F_2Cl_4$ | 1112-14-7 |
| HCFC | R-224cb | 1,1,3-Trichloro-1,2,2,3-tetrafluoropropane | $C_3HF_4Cl_3$ | 422-53-7 |
| HCFC | R-233cb | 1,1,3-Trichloro-1,2,2-trifluoropropane | $C_3H_2F_3Cl_3$ | 421-99-8 |
| HCFC | R-233ca | 1,1,3-Trichloro-2,2,3-trifluoropropane | $C_3H_2F_3Cl_3$ | 131221-36-8 |

TABLE 1-continued

| Type | ASHRAE Number | IUPAC Name | Molecular Formula | CAS Number |
|---|---|---|---|---|
| HCFC | R-225cc | 1,1-Dichloro-1,2,2,3,3-pentafluoropropane | $C_3HF_5Cl_2$ | 13474-88-9 |
| HCFC | R-234cd | 1,1-Dichloro-1,2,2,3-tetrafluoropropane | $C_3H_2F_4Cl_2$ | 70192-63-1 |
| HCFC | R-123b | 1,1-Dichloro-1,2,2-trifluoroethane | $C_2HF_3Cl_2$ | 812-04-4 |
| HCFC | R-243cc | 1,1-Dichloro-1,2,2-trifluoropropane | $C_3H_3F_3Cl_2$ | 7125-99-7 |
| HCFC | R-225eb | 1,1-Dichloro-1,2,3,3,3-pentafluoropropane | $C_3HF_5Cl_2$ | 111512-56-2 |
| HCFC | R-132c | 1,1-Dichloro-1,2-difluoroethane | $C_2H_2F_2Cl_2$ | 1842-05-3 |
| HCFC | R-252ec | 1,1-Dichloro-1,2-difluoropropane | $C_3H_4F_2Cl_2$ | |
| HCFC | R-234fb | 1,1-Dichloro-1,3,3,3-tetrafluoropropane | $C_3H_2F_4Cl_2$ | 64712-27-2 |
| HCFC | R-141b | 1,1-Dichloro-1-fluoroethane | $C_2H_3FCl_2$ | 1717-00-6 |
| HCFC | R-234cb | 1,1-Dichloro-2,2,3,3-tetrafluoropropane | $C_3H_2F_4Cl_2$ | 1/6/4071 |
| HCFC | R-243cb | 1,1-Dichloro-2,2,3-trifluoropropane | $C_3H_3F_3Cl_2$ | 70192-70-0 |
| HCFC | R-132a | 1,1-Dichloro-2,2-difluoroethane | $C_2H_2F_2Cl_2$ | 471-43-2 |
| HCFC | R-252cb | 1,1-Dichloro-2,2-difluoropropane | $C_3H_4F_2Cl_2$ | 1112-01-2 |
| HCFC | R-141a | 1,1-Dichloro-2-fluoroethane | $C_2H_3FCl_2$ | 430-53-5 |
| HCFC | R-225bb | 1,2-Dichloro-1,1,2,3,3-pentafluoropropane | $C_3HF_5Cl_2$ | 422-44-6 |
| HCFC | R-234bc | 1,2-Dichloro-1,1,2,3-tetrafluoropropane | $C_3H_2F_4Cl_2$ | 149329-26-0 |
| HCFC | R-123a | 1,2-Dichloro-1,1,2-trifluoroethane | $C_2HF_3Cl_2$ | 354-23-4 |
| HCFC | R-225da | 1,2-Dichloro-1,1,3,3,3-pentafluoropropane | $C_3HF_5Cl_2$ | 431-86-7 |
| HCFC | R-132b | 1,2-Dichloro-1,1-difluoroethane | $C_2H_2F_2Cl_2$ | 1649-08-7 |
| HCFC | R-252dc | 1,2-Dichloro-1,1-difluoropropane | $C_3H_4F_2Cl_2$ | |
| HCFC | R-234ba | 1,2-Dichloro-1,2,3,3-tetrafluoropropane | $C_3H_2F_4Cl_2$ | 425-94-5 |
| HCFC | R-141 | 1,2-Dichloro-1-fluoroethane | $C_2H_3FCl_2$ | 430-57-9 |
| HCFC | R-261ba | 1,2-Dichloro-2-fluoropropane | $C_3H_5FCl_2$ | 420-97-3 |
| HCFC | R-224ca | 1,3,3-Trichloro-1,1,2,2-tetrafluoropropane | $C_3HF_4Cl_3$ | 422-54-8 |
| HCFC | R-225cb | 1,3-Dichloro-1,1,2,2,3-pentafluoropropane | $C_3HF_5Cl_2$ | 507-55-1 |
| HCFC | R-234cc | 1,3-Dichloro-1,1,2,2-tetrafluoropropane | $C_3H_2F_4Cl_2$ | 422-00-5 |
| HCFC | R-225ea | 1,3-Dichloro-1,1,2,3,3-pentafluoropropane | $C_3HF_5Cl_2$ | 136013-79-1 |
| HCFC | R-243ec | 1,3-Dichloro-1,1,2-trifluoropropane | $C_3H_3F_3Cl_2$ | 149329-27-1 |
| HCFC | R-234fa | 1,3-Dichloro-1,1,3,3-tetrafluoropropane | $C_3H_2F_4Cl_2$ | 76140-39-1 |
| HCFC | R-234ca | 1,3-Dichloro-1,2,2,3-tetrafluoropropane | $C_3H_2F_4Cl_2$ | 70341-81-0 |
| HCFC | R-243ca | 1,3-Dichloro-1,2,2-trifluoropropane | $C_3H_3F_3Cl_2$ | 67406-68-2 |
| HCFC | R-243ea | 1,3-Dichloro-1,2,3-trifluoropropane | $C_3H_3F_3Cl_2$ | 151771-08-3 |
| HCFC | R-252ca | 1,3-Dichloro-2,2-difluoropropane | $C_3H_4F_2Cl_2$ | 1112-36-3 |
| HCFC | R-226cb | 1-Chloro-1,1,2,2,3,3-hexafluoropropane | $C_3HF_6Cl$ | 422-55-9 |
| HCFC | R-235cc | 1-Chloro-1,1,2,2,3-pentafluoropropane | $C_3H_2F_5Cl$ | 679-99-2 |
| HCFC | R-124a | 1-Chloro-1,1,2,2-tetrafluoroethane | $C_2HF_4Cl$ | 354-25-6 |
| HCFC | R-244cc | 1-Chloro-1,1,2,2-tetrafluoropropane | $C_3H_3F_4Cl$ | 421-75-0 |
| HCFC | R-226ea | 1-Chloro-1,1,2,3,3,3-hexafluoropropane | $C_3HF_6Cl$ | 359-58-0 |
| HCFC | R-244ec | 1-Chloro-1,1,2,3-tetrafluoropropane | $C_3H_3F_4Cl$ | |
| HCFC | R-133b | 1-Chloro-1,1,2-Trifluoroethane | $C_2H_2F_3Cl$ | 421-04-5 |
| HCFC | R-253ec | 1-Chloro-1,1,2-trifluoropropane | $C_3H_4F_3Cl$ | |
| HCFC | R-235fa | 1-Chloro-1,1,3,3,3-pentafluoropropane | $C_3H_2F_5Cl$ | 677-55-4 |
| HCFC | R-244fb | 1-Chloro-1,1,3,3-tetrafluoropropane | $C_3H_3F_4Cl$ | 2730-64-5 |
| HCFC | R-253fc | 1-Chloro-1,1,3-trifluoropropane | $C_3H_4F_3Cl$ | |
| HCFC | R-142b | 1-Chloro-1,1-difluoroethane | $C_2H_3F_2Cl$ | 75-68-3 |
| HCFC | R-235ca | 1-Chloro-1,2,2,3,3-pentafluoropropane | $C_3H_2F_5Cl$ | 28103-66-4 |
| HCFC | R-244cb | 1-Chloro-1,2,2,3-tetrafluoropropane | $C_3H_3F_4Cl$ | 67406-66-0 |
| HCFC | R-133 | 1-Chloro-1,2,2-Trifluoroethane | $C_2H_2F_3Cl$ | 431-07-2 |

TABLE 1-continued

| Type | ASHRAE Number | IUPAC Name | Molecular Formula | CAS Number |
|---|---|---|---|---|
| HCFC | R-253cb | 1-Chloro-1,2,2-trifluoropropane | $C_3H_4F_3Cl$ | 70192-76-6 |
| HCFC | R-253eb | 1-Chloro-1,2,3-trifluoropropane | $C_3H_4F_3Cl$ | |
| HCFC | R-142a | 1-Chloro-1,2-difluoroethane | $C_2H_3F_2Cl$ | 25497-29-4 |
| HCFC | R-262fb | 1-Chloro-1,3-difluoropropane | $C_3H_5F_2Cl$ | |
| HCFC | R-151a | 1-Chloro-1-fluoroethane | $C_2H_4ClF$ | 1615-75-4 |
| HCFC | R-271fb | 1-Chloro-1-fluoropropane | $C_3H_6FCl$ | |
| HCFC | R-133a | 1-Chloro-2,2,2-Trifluoroethane | $C_2H_2F_3Cl$ | 75-88-7 |
| HCFC | R-253ca | 1-Chloro-2,2,3-trifluoropropane | $C_3H_4F_3Cl$ | 56758-54-4 |
| HCFC | R-262ca | 1-Chloro-2,2-difluoropropane | $C_3H_5F_2Cl$ | 420-99-5 |
| HCFC | R-225aa | 2,2-Dichloro-1,1,1,3,3-pentafluoropropane | $C_3HF_5Cl_2$ | 128903-21-9 |
| HCFC | R-234ab | 2,2-Dichloro-1,1,1,3-tetrafluoropropane | $C_3H_2F_4Cl_2$ | 149329-24-8 |
| HCFC | R-123 | 2,2-Dichloro-1,1,1-trifluoroethane | $C_2HF_3Cl_2$ | 306-83-2 |
| HCFC | R-234aa | 2,2-Dichloro-1,1,3,3-tetrafluoropropane | $C_3H_2F_4Cl_2$ | 17705-30-5 |
| HCFC | R-225ba | 2,3-Dichloro-1,1,1,2,3-pentafluoropropane | $C_3HF_5Cl_2$ | 422-48-0 |
| HCFC | R-234bb | 2,3-Dichloro-1,1,1,2-tetrafluoropropane | $C_3H_2F_4Cl_2$ | 149329-25-9 |
| HCFC | R-234da | 2,3-Dichloro-1,1,1,3-tetrafluoropropane | $C_3H_2F_4Cl_2$ | 146916-90-7 |
| HCFC | R-243da | 2,3-Dichloro-1,1,1-trifluoropropane | $C_3H_3F_3Cl_2$ | 338-75-0 |
| HCFC | R-226ba | 2-Chloro-1,1,1,2,3,3-hexafluoropropane | $C_3HF_6Cl$ | 51346-64-6 |
| HCFC | R-124 | 2-Chloro-1,1,1,2-tetrafluoroethane | $C_2HF_4Cl$ | 2837-89-0 |
| HCFC | R-244bb | 2-Chloro-1,1,1,2-tetrafluoropropane | $C_3H_3F_4Cl$ | 421-73-8 |
| HCFC | R-226da | 2-Chloro-1,1,1,3,3,3-hexafluoropropane | $C_3HF_6Cl$ | 431-87-8 |
| HCFC | R-235da | 2-Chloro-1,1,1,3,3-pentafluoropropane | $C_3H_2F_5Cl$ | 134251-06-2 |
| HCFC | R-244db | 2-Chloro-1,1,1,3-tetrafluoropropane | $C_3H_3F_4Cl$ | 117970-90-8 |
| HCFC | R-253bb | 2-Chloro-1,1,2-trifluoropropane | $C_3H_4F_3Cl$ | |
| HCFC | R-244da | 2-Chloro-1,1,3,3-tetrafluoropropane | $C_3H_3F_4Cl$ | 19041-02-2 |
| HCFC | R-244ba | 2-Chloro-1,2,3,3-tetrafluoropropane | $C_3H_3F_4Cl$ | |
| HCFC | R-253ba | 2-Chloro-1,2,3-trifluoropropane | $C_3H_4F_3Cl$ | |
| HCFC | R-271d | 2-Chloro-1-fluoropropane | $C_3H_6FCl$ | |
| HCFC | R-271b | 2-Chloro-2-fluoropropane | $C_3H_6FCl$ | 420-44-0 |
| HCFC | R-225ca | 3,3-Dichloro-1,1,1,2,2-pentafluoropropane | $C_3HF_5Cl_2$ | 422-56-0 |
| HCFC | R-226ca | 3-Chloro-1,1,1,2,2,3-hexafluoropropane | $C_3HF_6Cl$ | 422-57-1 |
| HCFC | R-235cb | 3-Chloro-1,1,1,2,3-pentafluoropropane | $C_3H_2F_5Cl$ | 422-02-6 |
| HCFC | R-244eb | 3-Chloro-1,1,1,2-tetrafluoropropane | $C_3H_3F_4Cl$ | |
| HCFC | R-244fa | 3-Chloro-1,1,1,3-tetrafluoropropane | $C_3H_3F_4Cl$ | |
| HCFC | R-253fb | 3-Chloro-1,1,1-trifluoropropane | $C_3H_4F_3Cl$ | 460-35-5 |
| HCFC | R-244ca | 3-Chloro-1,1,2,2-tetrafluoropropane | $C_3H_3F_4Cl$ | 679-85-6 |
| HCFC | R-244ea | 3-Chloro-1,1,2,3-tetrafluoropropane | $C_3H_3F_4Cl$ | |
| HCFC | R-253ea | 3-Chloro-1,1,2-trifluoropropane | $C_3H_4F_3Cl$ | |
| HCFC | R-262fa | 3-Chloro-1,1-difluoropropane | $C_3H_5F_2Cl$ | |
| HCFC | R-253fa | 3-Chloro-1,3,3-trifluoropropane | $C_3H_4F_3Cl$ | |
| HCFC | R-142 | Chlorodifluoroethane | $C_2H_3F_2Cl$ | 25497-29-4 |
| HCFC | R-22 | Chlorodifluoromethane | $CHClF_2$ | 75-45-6 |
| HCFC | R-262 | Chlorodifluoropropane | $C_3H_5F_2Cl$ | 134190-53-7 |
| HCFC | R-151 | Chlorofluoroethane | $C_2H_4ClF$ | 110587-14-9 |
| HCFC | R-31 | Chlorofluoromethane | $CH_2FCl$ | 593-70-4 |
| HCFC | R-271 | Chlorofluoropropane | $C_3H_6FCl$ | 134190-54-8 |
| HCFC | R-226 | Chlorohexafluoropropane | $C_3HF_6Cl$ | 134308-72-8 |
| HCFC | R-235 | Chloropentafluoropropane | $C_3H_2F_5Cl$ | 134237-41-5 |
| HCFC | R-244 | Chlorotetrafluoropropane | $C_3H_3F_4Cl$ | 134190-50-4 |
| HCFC | R-253 | Chlorotrifluoropropane | $C_3H_4F_3Cl$ | 134237-44-8 |
| HCFC | R-132 | Dichlorodifluoroethane | $C_2H_2F_2Cl_2$ | 25915-78-0 |
| HCFC | R-252 | Dichlorodifluoropropane | $C_3H_4F_2Cl_2$ | 134190-52-6 |
| HCFC | R-21 | Dichlorofluoromethane | $CHFCl_2$ | 75-43-4 |
| HCFC | R-261 | Dichlorofluoropropane | $C_3H_5FCl_2$ | 134237-45-9 |
| HCFC | R-225 | Dichloropentafluoropropane | $C_3HF_5Cl_2$ | 127564-92-5 |
| HCFC | R-234 | Dichlorotetrafluoropropane | $C_3H_2F_4Cl_2$ | 127564-83-4 |

TABLE 1-continued

| Type | ASHRAE Number | IUPAC Name | Molecular Formula | CAS Number |
|---|---|---|---|---|
| HCFC | R-243 | Dichlorotrifluoropropane | $C_3H_3F_3Cl_2$ | 134237-43-7 |
| HCFC | R-222 | Pentachlorodifluoropropane | $C_3HF_2Cl_5$ | 134237-36-8 |
| HCFC | R-231 | Pentachlorofluoropropane | $C_3H_2FCl_5$ | 134190-48-0 |
| HCFC | R-500 | R-/152a (73.8/26.2) | 73.8% $CCl_2F_2$•26.2% $C_2H_4F_2$ | Carrene #7[2] |
| HCFC | R-505 | R-/31 (78/22) | 78% $CCl_2F_2$•22% $CH_2FCl$ | |
| HCFC | R-408A | R-/143a/22 (7 ± 2/46 ± 1/47 ± 2) | 7 ± 2% $C_2HF_5$•46 ± 1% $C_2H_3F_3$•47 ± 2% $CHClF_2$ | FX-10[2][1] |
| HCFC | R-402B | R-/290/22 (38 ± 2/2 ± 1/60 ± 2) | 38 ± 2% $C_2HF_5$•2 ± 1% $C_3H_8$•60 ± 2% $CHClF_2$ | HP-81[2][1] |
| HCFC | R-402A | R-/290/22 (60 ± 2/2 ± 1/38 ± 2) | 60 ± 2% $C_2HF_5$•2 ± 1% $C_3H_8$•38 ± 2% $CHClF_2$ | HP-80[2][1] |
| HCFC | R-416A | R-a/124/600 (59 + .5,−1/39.5 + 1,−.5/1.5 + 1,−.2) | 59 + .5,−1% $C_2H_2F_4$•39.5 + 1,−.5% $C_2HF_4Cl$•1.5 + 1,−.2% $C_4H_{10}$ | FRIGC (FR-)[2] |
| HCFC | R-420A | R-a/142b (88 + 1,−0/12 + 0,−1) | 88 + 1,−0% $C_2H_2F_4$•12 + 0,−1% $C_2H_3F_2Cl$ | Choice Refrigerant[1] |
| HCFC | R-502 | R-/115 (48.8/51.2) | 48.8% $CHClF_2$•51.2% $C_2F_5Cl$ | |
| HCFC | R-501 | R-/12 (75/25) | 75% $CHClF_2$•25% $CCl_2F_2$ | |
| HCFC | R-409A | R-/124/142b (60 ± 2/25 ± 2/15 ± 1) | 60 ± 2% $CHClF_2$•25 ± 2% $C_2HF_4Cl$•15 ± 1% $C_2H_3F_2Cl$ | FX-56[2][1] |
| HCFC | R-409B | R-/124/142b (65 ± 2/25 ± 2/10 ± 1) | 65 ± 2% $CHClF_2$•25 ± 2% $C_2HF_4Cl$•10 ± 1% $C_2H_3F_2Cl$ | FX-57[2] |
| HCFC | R-414B | R-/124/600a/142b (50 ± 2/39 ± 2/1.5 ± .5/9.5 + .5,−1) | 50 ± 2% $CHClF_2$•39 ± 2% $C_2HF_4Cl$•1.5 ± .5% $C_4H_{10}$•9.5 + .5,−1% $C_2H_3F_2Cl$ | Hot Shot,[2][1] Kar Kool[2] |
| HCFC | R-414A | R-/124/600a/142b (51 ± 2/28.5 ± 2/4 ± .5/16.5 + .5,−1) | 51 ± 2% $CHClF_2$•28.5 ± 2% $C_2HF_4Cl$•4 ± .5% $C_4H_{10}$•16.5 + .5,−1% $C_2H_3F_2Cl$ | GHG-X4,[2] Autofrost,[2] Chill-It[2] |
| HCFC | R-415B | R-/152a (25 ± 1/75 ± 1) | 25 ± 1% $CHClF_2$•75 ± 1% $C_2H_4F_2$ | |
| HCFC | R-415A | R-/152a (82 ± 1/18 ± 1) | 82 ± 1% $CHClF_2$•18 ± 1% $C_2H_4F_2$ | |
| HCFC | R-401C | R-/152a/124 (33 ± 2/15 + .5,−1.5/52 ± 1) | 33 ± 2% $CHClF_2$•15 + .5,−1.5% $C_2H_4F_2$•52 ± 1% $C_2HF_4Cl$ | MP-52[1] |
| HCFC | R-401A | R-/152a/124 (53 ± 2/13 + .5,−1.5/34 ± 1) | 53 ± 2% $CHClF_2$•13 + .5,−1.5% $C_2H_4F_2$•34 ± 1% $C_2HF_4Cl$ | MP-39[2][1] |
| HCFC | R-401B | R-/152a/124 (61 ± 2/11 + .5,−1.5/28 ± 1) | 61 ± 2% $CHClF_2$•11 + .5,−1.5% $C_2H_4F_2$•28 ± 1% $C_2HF_4Cl$ | MP-66[2][1] |
| HCFC | R-405A | R-/152a/142b/C318 (45 ± 0/7 ± 1/5.5 ± 1/42.5 ± 2) | 45 ± 0% $CHClF_2$•7 ± 1% $C_2H_4F_2$•5.5 ± 1% $C_2H_3F_2Cl$•42.5 ± 2% $C_4F_8$ | GREENCOOL G2015[2] |
| HCFC | R-509[A] | R-/218 (44/56) | 44% $CHClF_2$•56% $C_3F_8$ | Arcton TP5R2[2] |
| HCFC | R-412A | R-/218/142b (70 ± 2/5 ± 2/25 ± 1) | 70 ± 2% $CHClF_2$•5 ± 2% $C_3F_8$•25 ± 1% $C_2H_3F_2Cl$ | Arcton TP5R[2] |
| HCFC | R-406A | R-/600a/142b (55 ± 2/4 ± 1/41 ± 0) | 55 ± 2% $CHClF_2$•4 ± 1% $C_4H_{10}$•41 ± 0% $C_2H_3F_2Cl$ | GHG[2][1] |

TABLE 1-continued

| Type | ASHRAE Number | IUPAC Name | Molecular Formula | CAS Number |
|---|---|---|---|---|
| HCFC | R-406B | R-/600a/142b (65 ± 2/4 ± 1/31 ± 0) | 65 ± 2% $CHClF_2$•4 ± 1% $C_4H_{10}$•31 ± 0% $C_2H_3F_2Cl$ | GHG-HP[2] |
| HCFC | R-503 | R-/13 (40.1/59.9) | 40.1% $CHF_3$•59.9% $CClF_3$ | |
| HCFC | R-418A | R-0/22/152a (1.5 ± .5/96 ± 1/2.5 ± .5) | 1.5 ± .5% $C_3H_8$•96 ± 1% $CHClF_2$•2.5 ± .5% $C_2H_4F_2$ | |
| HCFC | R-403B | R-0/22/218 (5 + .2,−2/56 ± 2/39 ± 0) | 5 + .2,−2% $C_3H_8$•56 ± 2% $CHClF_2$•39 ± 0% $C_3F_8$ | ISCEON 69-L[2] |
| HCFC | R-403A | R-0/22/218 (5 + .2,−2/75 ± 2/20 ± 0) | 5 + .2,−2% $C_3H_8$•75 ± 2% $CHClF_2$•20 ± 0% $C_3F_8$ | ISCEON 69-S[2] |
| HCFC | R-506 | R-/114 (55.1/44.9) | 55.1% $CH_2FCl$•44.9% $C_2F_4Cl_2$ | |
| HCFC | R-504 | R-/115 (48.2/51.8) | 48.2% $CH_2F_2$•51.8% $C_2F_5Cl$ | |
| HCFC | R-232 | Tetrachlorodifluoropropane | $C_3H_2F_2Cl_4$ | 134237-39-1 |
| HCFC | R-241 | Tetrachlorofluoropropane | $C_3H_3FCl_4$ | 134190-49-1 |
| HCFC | R-223 | Tetrachlorotrifluoropropane | $C_3HF_3Cl_4$ | 134237-37-9 |
| HCFC | R-242 | Trichlorodifluoropropane | $C_3H_3F_2Cl_3$ | 134237-42-6 |
| HCFC | R-251 | Trichlorofluoropropane | $C_3H_4FCl_3$ | 134190-51-5 |
| HCFC | R-224 | Trichlorotetrafluoropropane | $C_3HF_4Cl_3$ | 134237-38-0 |
| HCFC | R-233 | Trichlorotrifluoropropane | $C_3H_2F_3Cl_3$ | 134237-40-4 |
| HCFO | R-1233zd | 1-Chloro-3,3,3-trifluoropropene | $C_3H_2ClF_3$ | 2730-43-0 |
| HCFO | R-411A | R-0/22/152a (1.5 + 0,−1/87.5 + 2,−0/11 + 0,−1) | 1.5 + 0,−1% $C_3H_6$•87.5 + 2,−0% $CHClF_2$•11 + 0,−1% $C_2H_4F_2$ | GREENCOOL G2018a[2] |
| HCFO | R-411B | R-0/22/152a (3 + 0,−1/94 + 2,−0/3 + 0,−1) | 3 + 0,−1% $C_3H_6$•94 + 2,−0% $CHClF_2$•3 + 0,−1% $C_2H_4F_2$ | GREENCOOL G2018b[2] |
| HCFO | R-411C | R-0/22/152a (3 + 0,−1/95.5 + 2,−0/1.5 + 0,−1) | 3 + 0,−1% $C_3H_6$•95.5 + 2,−0% $CHClF_2$•1.5 + 0,−1% $C_2H_4F_2$ | GREENCOOL G2018c[2] |
| HCO | R-1140 | Chloroethylene (vinyl chloride) | $C_2H_3Cl$ | 75-01-4 |
| HCO | R-1130 | cis-1,2-Dichloroethylene | $C_2H_2Cl_2$ | 156-59-2 |
| HCO | R-1120 | Trichloroethylene (trielene) | $C_2HCl_3$ | 79-01-6 |
| HFC | R-329ccb | 1,1,1,2,2,3,3,4,4-Nonafluorobutane | $C_4HF_9$ | 375-17-7 |
| HFC | R-347ccd | 1,1,1,2,2,3,3-Heptafluorobutane | $C_4H_3F_7$ | 662-00-0 |
| HFC | R-236cb | 1,1,1,2,2,3-Hexafluoropropane | $C_3H_2F_6$ | 677-56-5 |
| HFC | R-227ea | 1,1,1,2,3,3,3-Heptafluoropropane | $C_3HF_7$ | 431-89-0 |
| HFC | R-236ea | 1,1,1,2,3,3-Hexafluoropropane | $C_3H_2F_6$ | 431-63-0 |
| HFC | R-338eea | 1,1,1,2,3,4,4,4-Octafluorobutane | $C_4H_2F_8$ | 75995-72-1 |
| HFC | R-245eb | 1,1,1,2,3-Pentafluoropropane | $C_3H_3F_5$ | 431-31-2 |
| HFC | R-134a | 1,1,1,2-Tetrafluoroethane | $C_2H_2F_4$ | 811-97-2 |
| HFC | R-236fa | 1,1,1,3,3,3-Hexafluoropropane | $C_3H_2F_6$ | 690-39-1 |
| HFC | R-365mfc | 1,1,1,3,3-Pentafluorobutane | $C_4H_5F_5$ | 406-58-6 |
| HFC | R-245fa | 1,1,1,3,3-Pentafluoropropane | $C_3H_3F_5$ | 460-73-1 |
| HFC | R-143a | 1,1,1-Trifluoroethane | $C_2H_3F_3$ | 420-46-2 |
| HFC | R-ca | 1,1,2,2,3,3,3-Heptafluoropropane | $C_3HF_7$ | 2252-84-8 |
| HFC | R-245ca | 1,1,2,2,3-Pentafluoropropane | $C_3H_3F_5$ | 679-86-7 |
| HFC | R-134 | 1,1,2,2-Tetrafluoroethane | $C_2H_2F_4$ | 359-35-3 |
| HFC | R-254cb | 1,1,2,2-Tetrafluoropropane | $C_3H_4F_4$ | 40723-63-5 |
| HFC | R-245ea | 1,1,2,3,3-Pentafluoropropane | $C_3H_3F_5$ | 24270-66-4 |
| HFC | R-143 | 1,1,2-Trifluoroethane | $C_2H_3F_3$ | 430-66-0 |
| HFC | R-152a | 1,1-Difluoroethane | $C_2H_4F_2$ | 75-37-6 |
| HFC | R-236me | 1,2,2,2-Tetrafluoroethyl difluoromethyl ether | $C_3H_2F_6O$ | 57041-67-5 |
| HFC | R-152 | 1,2-Difluoroethane | $C_2H_4F_2$ | 624-72-6 |
| HFC | R-E143a | 2,2,2-Trifluoroethyl methyl ether | $C_3H_5F_3O$ | 460-43-5 |
| HFC | R-E134 | Bis(difluoromethyl)ether | $C_2H_2F_4O$ | 1691-17-4 |
| HFC | R-32 | Difluoromethane | $CH_2F_2$ | 75-10-5 |
| HFC | R-245qc | Difluoromethyl 1,1,2-trifluoroethyl ether | $C_3H_3F_5O$ | 69948-24-9 |
| HFC | R-245mf | Difluoromethyl 2,2,2-trifluoroethyl ether | $C_3H_3F_5O$ | 1885-48-9 |
| HFC | R-272 | Difluoropropane | $C_3H_6F_2$ | |
| HFC | R-161 | Fluoroethane | $C_2H_5F$ | 353-36-6 |
| HFC | R-41 | Fluoromethane | $CH_3F$ | 593-53-3 |
| HFC | R-281 | Fluoropropane | $C_3H_7F$ | |
| HFC | R-FE-36 | Hexafluoropropane | $C_3H_2F_6$ | 359-58-0 |

TABLE 1-continued

| Type | ASHRAE Number | IUPAC Name | Molecular Formula | CAS Number |
|------|---------------|------------|-------------------|------------|
| HFC | R-254pc | Methyl 1,1,2,2-tetrafluoroethyl ether | $C_3H_4F_4O$ | 425-88-7 |
| HFC | R-245mc | Methyl pentafluoroethyl ether | $C_3H_3F_5O$ | 22410-44-2 |
| HFC | R-143m | Methyl trifluoromethyl ether | $C_2H_3F_3O$ | 421-14-7 |
| HFC | R-E125 | Pentafluorodimethyl ether | $C_2HF_5O$ | 3822-68-2 |
| HFC | R-125 | Pentafluoroethane | $C_2HF_5$ | 354-33-6 |
| HFC | R-245cb | Pentafluoropropane | $C_3H_3F_5$ | 1814-88-6 |
| HFC | R-347mmy | Perfluoroisopropyl methyl ether | $C_4H_3F_7O$ | 22052-84-2 |
| HFC | R-347mcc | Perfluoropropyl methyl ether | $C_4H_3F_7O$ | 375-03-1 |
| HFC | R-421A | R-/134a (58 ± 1/42 ± 1) | 58 ± 1% $C_2HF_5$•42 ± 1% $C_2H_2F_4$ | Choice R421A[1] |
| HFC | R-421B | R-/134a (85 ± 1/15 ± 1) | 85 ± 1% $C_2HF_5$•15 ± 1% $C_2H_2F_4$ | Choice 421B[1] |
| HFC | R-417A | R-/134a/600 (46.6 ± 1.1/50 ± 1/3.4 + .1,−.4) | 46.6 ± 1.1% $C_2HF_5$•50 ± 1% $C_2H_2F_4$•3.4 + .1,−.4% $C_4H_{10}$ | ISCEON 59,[2] NU-22[2] |
| HFC | R-417B | R-/134a/600 (79 ± 1/18.3 ± 1/2.7 + .1,−.5) | 79 ± 1% $C_2HF_5$•18.3 ± 1% $C_2H_2F_4$•2.7 + .1,−.5% $C_4H_{10}$ | |
| HFC | R-437A | R-/134a/600/601 (19.5 + .5,−1.8/ 78.5 + 1.5,−.7/1.4 + .1,−.2/ .6 + .1,−.2) | 19.5 + .5,−1.8% $C_2HF_5$•78.5 + 1.5,−.7% $C_2H_2F_4$•1.4 + .1,−.2% $C_4H_{10}$•.6 + .1,−.2% $C_5H_{12}$ | |
| HFC | R-426A | R-/134a/600/601a (5.1 + 1/93 ± 1/1.3 + .1,−.2/.6 + .1,−.2) | 5.1 ± 1% $C_2HF_5$•93 ± 1% $C_2H_2F_4$•1.3 + .1,−.2% $C_4H_{10}$•.6 + .1,−.2% $C_5H_{12}$ | RS-24 (new comp.)[1] |
| HFC | R-422B | R-/134a/600a (55 ± 1/42 ± 1/3 + .1,−.5) | 55 ± 1% $C_2HF_5$•42 ± 1% $C_2H_2F_4$•3 + .1,−.5% $C_4H_{10}$ | ICOR XAC1[1] |
| HFC | R-422D | R-/134a/600a (65.1 + .9,−1.1/ 31.5 ± 1/3.4 + .1,−.4) | 65.1 + .9,−1.1% $C_2HF_5$•31.5 ± 1% $C_2H_2F_4$•3.4 + .1,−.4% $C_4H_{10}$ | ISCEON MO29[1] |
| HFC | R-422C | R-/134a/600a (82 ± 1/15 ± 1/3 + .1,−.5) | 82 ± 1% $C_2HF_5$•15 ± 1% $C_2H_2F_4$•3 + .1,−.5% $C_4H_{10}$ | ICOR XLT1[1] |
| HFC | R-422A | R-/134a/600a (85.1 ± 1/11.5 ± 1/3.4 + .1,−.4) | 85.1 ± 1% $C_2HF_5$•11.5 ± 1% $C_2H_2F_4$•3.4 + .1,−.4% $C_4H_{10}$ | ISCEON 79[1] |
| HFC | R-424A | R-/134a/600a/600/601a (50.5 ± 1/47 ± 1/.9 + .1,−.2/ 1 + .1,+.2/.6 + .1,−.2) | 50.5 ± 1% $C_2HF_5$•47 ± 1% $C_2H_2F_4$•1.9 + .3,−.1% $C_4H_{10}$•.6 + .1,−.2% $C_5H_{12}$ | RS-44 (new comp.)[1] |
| HFC | R-419A | R-/134a/E170 (77 ± 1/19 ± 1/4 ± 1) | 77 ± 1% $C_2HF_5$•19 ± 1% $C_2H_2F_4$•4 ± 1% $C_2H_6O$ | |
| HFC | R-507[A] | R-/143a (50/50) | 50% $C_2HF_5$•50% $C_2H_3F_3$ | AZ-50[2][1] |
| HFC | R-404A | R-/143a/134a (44 ± 2/52 ± 1/4 ± 2) | 44 ± 2% $C_2HF_5$•52 ± 1% $C_2H_3F_3$•4 ± 2% $C_2H_2F_4$ | HP-62,[2][1] FX-70[2][1] |
| HFC | R-434A | R-/143a/134a/600a (63.2 ± 1/18 ± 1/16 ± 1/2.8 + .1,−.2) | 63.2 ± 1% $C_2HF_5$•18 ± 1% $C_2H_3F_3$•16 ± 1% $C_2H_2F_4$•2.8 + .1,−.2% $C_4H_{10}$ | RS-45[1] |
| HFC | R-428A | R-/143a/290/600a (77.5 ± 1/20 ± 1/.6 + .1,−.2/1.9 + .1,−.2) | 77.5 ± 1% $C_2HF_5$•20 ± 1% $C_2H_3F_3$•.6 + .1,−.2% $C_3H_8$•1.9 + .1,−.2% $C_4H_{10}$ | RS-52[1] |
| HFC | R-423A | R-a/227ea (52.5 ± 1/47.5 ± 1) | 52.5 ± 1% $C_2H_2F_4$•47.5 ± 1% $C_3HF_7$ | |
| HFC | R-430A | R-a/600a (76 ± 1/24 ± 1) | 76 ± 1% $C_2H_4F_2$•24 ± 1% $C_4H_{10}$ | |
| HFC | R-413A | R-/134a/600a (9 ± 1/88 ± 2/3 + 0,−1) | 9 ± 1% $C_3F_8$•88 ± 2% $C_2H_2F_4$•3 + 0,−1% $C_4H_{10}$ | ISCEON 49[2] |

TABLE 1-continued

| Type | ASHRAE Number | IUPAC Name | Molecular Formula | CAS Number |
|---|---|---|---|---|
| HFC | R-508[A] | R-/116 (39/61) | 39% $CHF_3$•61% $C_2F_6$ | Klea 5R3[2][1] |
| HFC | R-508B | R-/116 (46/54) | 46% $CHF_3$•54% $C_2F_6$ | Suva 95[2][1] |
| HFC | R-440A | R-0/134a/152a (.6 ± .1/1.6 ± .6/97.8 ± .5) | .6 ± .1% $C_3H_8$•1.6 ± .6% $C_2H_2F_4$•97.8 ± .5% $C_2H_4F_2$ | |
| HFC | R-431A | R-0/152a (71 ± 1/29 ± 1) | 71 ± 1% $C_3H_8$•29 ± 1% $C_2H_4F_2$ | |
| HFC | R-410B | R-/125 (45 ± 1/55 ± 1) | 45 ± 1% $CH_2F_2$•55 ± 1% $C_2HF_5$ | AC9100[1] |
| HFC | R-410A | R-/125 (50 + .5,−1.5/50 + 1.5,−.5) | 50 + .5,−1.5% $CH_2F_2$•50 + 1.5,−.5% $C_2HF_5$ | AZ-20,[2] Puron,[2] Suva 9100[2] |
| HFC | R-407B | R-/125/134a (10 ± 2/70 ± 2/20 ± 2) | 10 ± 2% $CH_2F_2$•70 ± 2% $C_2HF_5$•20 ± 2% $C_2H_2F_4$ | Klea 61[2] |
| HFC | R-407D | R-/125/134a (15 ± 2/15 ± 2/70 ± 2) | 15 ± 2% $CH_2F_2$•15 ± 2% $C_2HF_5$•70 ± 2% $C_2H_2F_4$ | |
| HFC | R-407A | R-/125/134a (20 ± 2/40 ± 2/40 ± 2) | 20 ± 2% $CH_2F_2$•40 ± 2% $C_2HF_5$•40 ± 2% $C_2H_2F_4$ | Klea 60[2][1] |
| HFC | R-407C | R-/125/134a (23 ± 2/25 ± 2/52 ± 2) | 23 ± 2% $CH_2F_2$•25 ± 2% $C_2HF_5$•52 ± 2% $C_2H_2F_4$ | Klea 66,[2] AC9000[1] |
| HFC | R-407E | R-/125/134a (25 ± 2/15 ± 2/60 ± 2) | 25 ± 2% $CH_2F_2$•15 ± 2% $C_2HF_5$•60 ± 2% $C_2H_2F_4$ | |
| HFC | R-407F | R-/125/134a (30 ± 2/30 ± 2/40 ± 2) | 30 ± 2% $CH_2F_2$•30 ± 2% $C_2HF_5$•40 ± 2% $C_2H_2F_4$ | Genetron Performax LT[1] |
| HFC | R-438A | R-/125/134a/600/601a (8.5 + .5,−1.5/ 45 ± 1.5/44.2 ± 1.5/1.7 + .1,−.2/ .6 + .1,−.2) | 8.5 + .5,−1.5% $CH_2F_2$•45 ± 1.5% $C_2HF_5$•44.2 ± 1.5% $C_2H_2F_4$•1.7 + .1,−.2% $C_4H_{10}$•.6 + .1,−.2% $C_5H_{12}$ | KDD5,[1] ISCEON MO99[1] |
| HFC | R-427A | R-/125/143a/134a (15 ± 2/25 ± 2/10 ± 2/50 ± 2) | 15 ± 2% $CH_2F_2$•25 ± 2% $C_2HF_5$•10 ± 2% $C_2H_3F_3$•50 ± 2% $C_2H_2F_4$ | Forane 427A[1] |
| HFC | R-439A | R-/125/600a (50 ± 1/47 ± 1/3 ± .5) | 50 ± 1% $CH_2F_2$•47 ± 1% $C_2HF_5$•3 ± .5% $C_4H_{10}$ | |
| HFC | R-425A | R-/134a/227ea (18.5 ± .5/69.5 ± .5/12 ± .5) | 18.5 ± .5% $CH_2F_2$•69.5 ± .5% $C_2H_2F_4$•12 ± .5% $C_3HF_7$ | |
| HFC | R-435A | R-E170/152a (80 ± 1/20 ± 1) | 80 ± 1% $C_2H_6O$•20 ± 1% $C_2H_4F_2$ | |
| HFC | R-429A | R-E170/152a/600a (60 ± 1/10 ± 1/30 ± 1) | 60 ± 1% $C_2H_6O$•10 ± 1% $C_2H_4F_2$•30 ± 1% $C_4H_{10}$ | |
| HFC | R-23 | Trifluoromethane (Fluoroform) | $CHF_3$ | 75-46-7 |
| HFC | R-227ca2 | Trifluoromethyl 1,1,2,2-tetrafluoroethyl ether | $C_3HF_7O$ | 2356-61-8 |
| HFC | R-227me | Trifluoromethyl 1,2,2,2-tetrafluoroethyl ether | $C_3HF_7O$ | 2356-62-9 |
| HFC | R-263 | Trifluoropropane | $C_3H_5F_3$ | |
| HFO | R-1132a | 1,1-Difluoroethylene | $C_2H_2F_2$ | 75-38-7 |
| HFO | R-1234ze | 1,3,3,3-Tetrafluoropropene | $C_3H_2F_4$ | 1645-83-6 |
| HFO | R-1234yf | 2,3,3,3-Tetrafluoropropene | $C_3H_2F_4$ | 754-12-1 |
| HFO | R-1141 | Fluoroethylene (vinyl fluoride) | $C_2H_3F$ | 75-02-5 |
| PCC | R-10 | Carbon tetrachloride (Tetrachloromethane) | $CCl_4$ | 56-23-5 |
| PCC | R-110 | Hexachloroethane | $C_2Cl_6$ | 67-72-1 |

[1]Composition of Refrigerant Blends, www.epa.gov/ozone/snap/refrigerants/refblend.html
[2]Andy's HVAC/R Web Page, users.isp.com/aschoen/refchart.pdf

What is claimed is:

1. A kit for retrofitting a refrigeration system from an HCFC refrigerant mixed with a compressor lubricant consisting of a mineral oil or alkyl benzene lubricant, to an HFC refrigerant compatible with a polyol ester lubricant, comprising:
    a U.S. Department of Transportation compliant refrigerant transport container; and
    an HFC refrigerant mixed with a compatible hygroscopic polyol ester compressor lubricant, in an amount of 5-20% by weight of the HFC refrigerant, within the U.S. Department of Transportation compliant transport container.

2. The kit according to claim 1, wherein the HFC refrigerant comprises a blend of difluoromethane (R-32), pentafluoroethane (R-125), and 1,1,1,2-tetrafluoroethane (R-134a).

3. The kit according to claim 1, wherein the HFC comprises R-407C.

4. The kit according to claim 1, wherein the compatible hygroscopic polyol ester compressor lubricant is present in an amount of 8% by weight of the HFC refrigerant.

5. The kit according to claim 1, wherein the compatible hygroscopic polyol ester compressor lubricant is present in an amount of 5-15% by weight of the HFC refrigerant.

6. The kit according to claim 1, wherein the U.S. Department of Transportation compliant refrigerant transport container is compliant at least one of DOT-39, DOT 3, DOT 3A, DOT 3AA, DOT 3AL, DOT 3B, DOT 3BN, DOT 3E, DOT 4B, DOT 4BA, DOT 4B240ET, DOT 4BW, DOT 4E, DOT 3AL1800; DOT 4D; DOT-3A1000; DOT-3A1200; DOT-3A150; DOT-3A1800; DOT-3A2000; DOT-3A225; DOT-3A240; DOT-3A2400; DOT-3A300; DOT-3A400; DOT-3A480; DOT-3A480X; DOT-3AA; DOT-3AA1000; DOT-3AA1200; DOT-3AA150; DOT-3AA1800; DOT-3AA2000; DOT-3AA225; DOT-3AA240; DOT-3AA2400; DOT-3AA300; DOT-3AA400; DOT-3AA480; DOT-3AAX1800; DOT-3AAX2000; DOT-3AAX2200; DOT-3AAX2400; DOT-3AL; DOT-3AL1000; DOT-3AL150; DOT-3AL1800; DOT-3AL2000; DOT-3AL225; DOT-3AL240; DOT-3AL2400; DOT-3AL400; DOT-3AL480; DOT-3AX1800; DOT-3AX2000; DOT-3AX2200; DOT-3AX2400; DOT-3B; DOT-3B150; DOT-3B1800; DOT-3B225; DOT-3B240; DOT-3B300; DOT-3B400; DOT-3BN400; DOT-3BN480; DOT-3E1800; DOT-3HT; DOT-3HT2000; DOT-3T1800; DOT-3T2000; DOT-3T2200; DOT-3T2400; DOT-4A; DOT-4AA480; DOT-4B; DOT-4B150; DOT-4B150; DOT-4B225; DOT-4B240; DOT-4B240ET; DOT-4B300; DOT-4B400; DOT-4B480; DOT-4BA; DOT-4BA225; DOT-4BA240; DOT-4BA300; DOT-4BA400; DOT-4BW225; DOT-4BW240; DOT-4BW300; DOT-4BW400; DOT-4BW480; DOT-4DA; DOT-4DS; DOT-4E225; DOT-4E240; DOT-4L; and DOT-AAX2400;
and DOT-AAX2400.

7. The kit according to claim 6, wherein the U.S. Department of Transportation compliant refrigerant transport container is compliant with DOT-39.

8. A U.S. Department of Transportation compliant transport container containing a mixture of an HFC refrigerant mixed with a compatible polyol ester compressor lubricant, in an amount of 5-20% by weight of the HFC refrigerant.

9. The U.S. Department of Transportation compliant transport container according to claim 8, compliant with at least one of:
    DOT-39, DOT 3, DOT 3A, DOT 3AA, DOT 3AL, DOT 3B, DOT 3BN, DOT 3E, DOT 4B, DOT 4BA, DOT 4B240ET, DOT 4BW, DOT 4E, DOT 3AL1800; DOT 4D; DOT-3A1000; DOT-3A1200; DOT-3A150; DOT-3A1800; DOT-3A2000; DOT-3A225; DOT-3A240; DOT-3A2400; DOT-3A300; DOT-3A400; DOT-3A480; DOT-3A480X; DOT-3AA; DOT-3AA1000; DOT-3AA1200; DOT-3AA150; DOT-3AA1800; DOT-3AA2000; DOT-3AA225; DOT-3AA240; DOT-3AA2400; DOT-3AA300; DOT-3AA400; DOT-3AA480; DOT-3AAX1800; DOT-3AAX2000; DOT-3AAX2200; DOT-3AAX2400; DOT-3AL; DOT-3AL1000; DOT-3AL150; DOT-3AL1800; DOT-3AL2000; DOT-3AL225; DOT-3AL240; DOT-3AL2400; DOT-3AL400; DOT-3AL480; DOT-3AX1800; DOT-3AX2000; DOT-3AX2200; DOT-3AX2400; DOT-3B; DOT-3B150; DOT-3B1800; DOT-3B225; DOT-3B240; DOT-3B300; DOT-3B400; DOT-3BN400; DOT-3BN480; DOT-3E1800; DOT-3HT; DOT-3HT2000; DOT-3T1800; DOT-3T2000; DOT-3T2200; DOT-3T2400; DOT-4A; DOT-4AA480; DOT-4B; DOT-4B150; DOT-4B150; DOT-4B225; DOT-4B240; DOT-4B240ET; DOT-4B300; DOT-4B400; DOT-4B480; DOT-4BA; DOT-4BA225; DOT-4BA240; DOT-4BA300; DOT-4BA400; DOT-4BW225; DOT-4BW240; DOT-4BW300; DOT-4BW400; DOT-4BW480; DOT-4DA; DOT-4DS; DOT-4E225; DOT-4E240; DOT-4L; and DOT-AAX2400;
    wherein the HFC refrigerant is selected from the group consisting of R-134a, R-404A, R-407A, R-407C, R-407F, R-410A, R-417A, R-417B, R-422A, R-422B, R-422C, R-422D, R-424A, R-427A, R-428A, R-434A, R-438A, R-442A, and RS07A; and
    the compatible polyol ester compressor lubricant is present in an amount of between 5% and 15% by weight of the HFC refrigerant.

10. A method for retrofitting a refrigeration system from an HCFC refrigerant mixed with a mineral oil or alkyl benzene lubricant to an HFC refrigerant, comprising:
    withdrawing all of the HCFC refrigerant from the refrigeration system and removing a portion of the mineral oil or alkyl benzene lubricant through a charge port of the refrigeration system, while leaving a portion of the mineral oil or alkyl benzene lubricant within the refrigeration system in an amount of at least 5% by weight of the HCFC refrigerant;
    providing a U.S. Department of Transportation compliant transport container containing an HFC refrigerant mixed with a compatible hygroscopic polyol ester compressor lubricant, in an amount of 5-20% by weight of the HFC refrigerant; and
    charging the refrigeration system through the charge port with the HFC refrigerant mixed with the compatible hygroscopic polyol ester compressor lubricant, in the amount of 5-20% by weight of the HFC refrigerant.

11. The method according to claim 10, wherein after charging the refrigeration system, the compatible hygroscopic polyol ester compressor lubricant is present in an amount of at least 10% by weight of the total weight of the compatible hygroscopic polyol ester compressor lubricant and the remaining mineral oil or alkyl benzene lubricant in the refrigeration system.

12. The method according to claim 10, wherein the compatible hygroscopic polyol ester compressor lubricant is present in an amount of about 8% by weight of the HFC refrigerant.

13. The method according to claim 10, wherein after charging the refrigeration system, the compatible hygroscopic polyol ester compressor lubricant is present in an amount of about 25% to 50% of the total weight of the compatible hygroscopic polyol ester compressor lubricant and the remaining mineral oil or alkyl benzene lubricant in the refrigeration system.

14. The method according to claim 10, wherein after charging the refrigeration system, the compatible hygroscopic polyol ester compressor lubricant and the remaining mineral oil or alkyl benzene lubricant in the refrigeration system are present in an amount of 15% to 32% by weight of the HFC refrigerant.

15. The method according to claim 10, wherein the remaining mineral oil or alkyl benzene lubricant in the refrigeration system is present in an amount of between 8% and 24% by weight of the HFC refrigerant.

16. The method according to claim 10, wherein the HCFC refrigerant comprises R-22.

17. The method according to claim 10, wherein the HFC refrigerant comprises difluoromethane (R-32), pentafluoroethane (R-125), and 1,1,1,2-tetrafluoroethane (R-134a).

18. The method according to claim 10, wherein the compatible hygroscopic polyol ester compressor lubricant and the remaining mineral oil or alkyl benzene lubricant in the refrigeration system are present in an amount of about 15% to 25% by weight of the HFC refrigerant.

19. The method according to claim 10, wherein the HFC refrigerant is selected from the group consisting of R-134a, R-404A, R-407A, R-407C, R-407F, R-410A, R-417A, R-417B, R-422A, R-422B, R-422C, R-422D, R-424A, R-427A, R-428A, R-434A, R-438A, R-442A, and RS07A.

20. The method according to claim 10, wherein the portion of the mineral oil or alkyl benzene lubricant left within the refrigeration system is at least 8% by weight of the HCFC refrigerant.

* * * * *